C. F. RAYNAUD.
BOX FOLDING MACHINE.
APPLICATION FILED JUNE 26, 1916.

1,230,516.

Patented June 19, 1917.
3 SHEETS—SHEET 1.

INVENTOR.
CHARLES F. RAYNAUD
BY
Carlos P. Griffin
ATTORNEY.

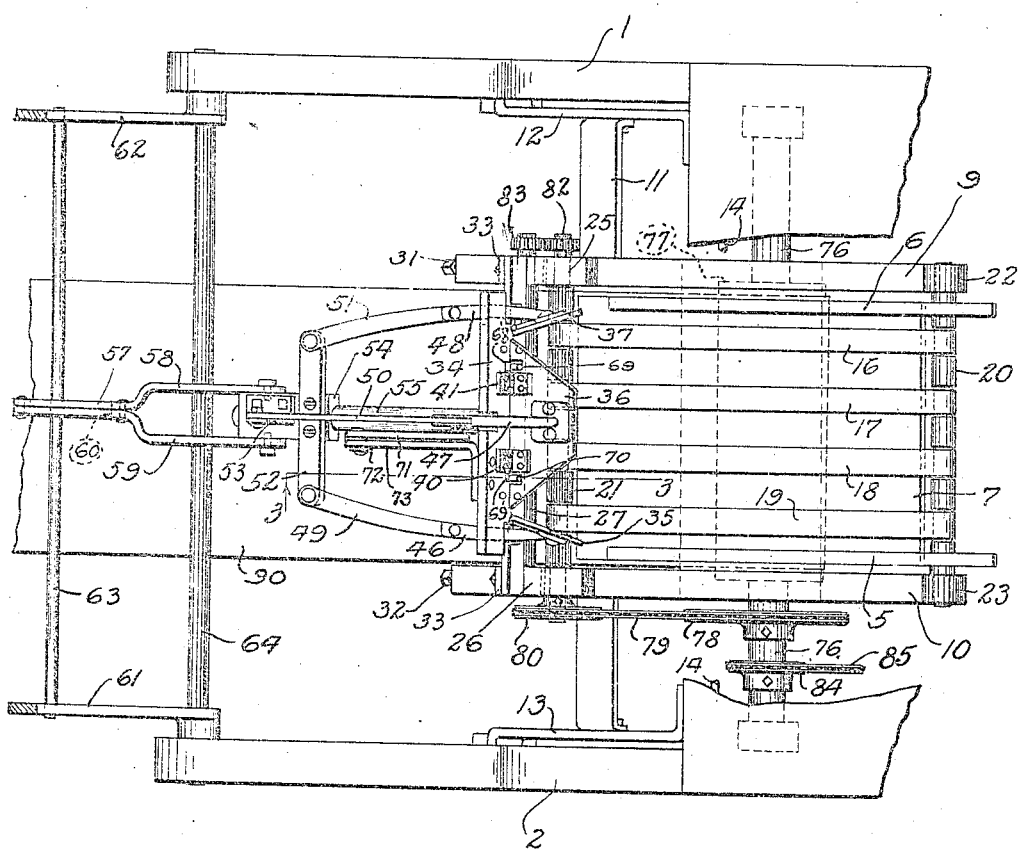

C. F. RAYNAUD.
BOX FOLDING MACHINE.
APPLICATION FILED JUNE 26, 1916.
1,230,516.
Patented June 19, 1917.
3 SHEETS—SHEET 3.
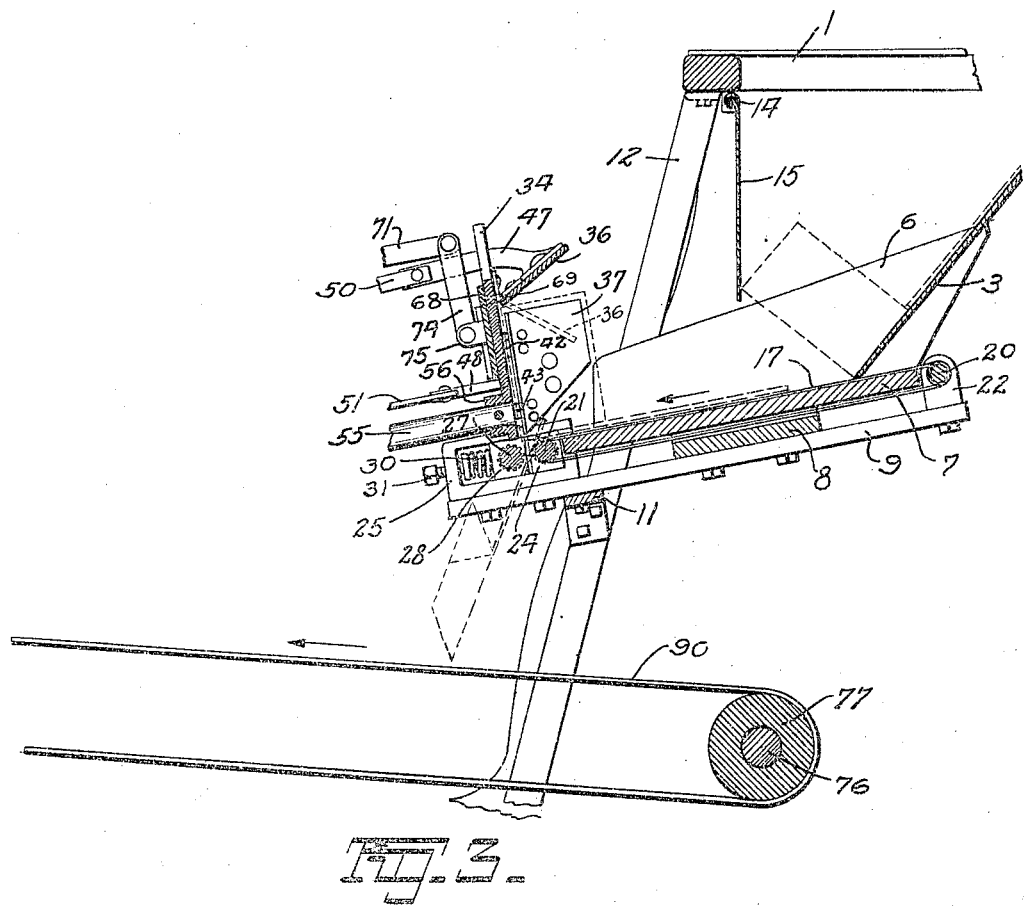
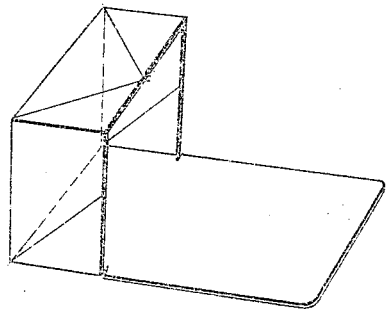
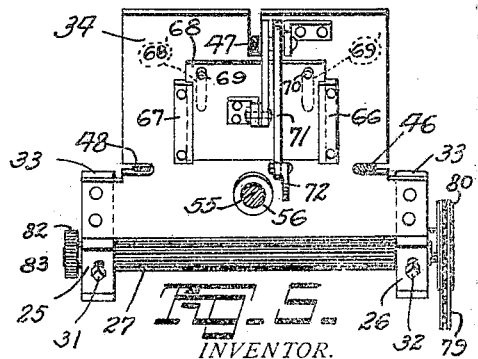
INVENTOR.
CHARLES F. RAYNAUD
BY
Carlos P. Griffin
ATTORNEY.

UNITED STATES PATENT OFFICE.

CHARLES F. RAYNAUD, OF SAN FRANCISCO, CALIFORNIA, ASSIGNOR TO PACIFIC FOLDING BOX FACTORY, A CORPORATION OF CALIFORNIA.

BOX-FOLDING MACHINE.

1,230,516.  Specification of Letters Patent.   Patented June 19, 1917.

Application filed June 26, 1916.  Serial No. 105,876.

*To all whom it may concern:*

Be it known that I, CHARLES F. RAYNAUD, a citizen of the United States, residing at San Francisco, in the county of San Francisco, State of California, have invented a new and useful Box-Folding Machine, of which the following is a specification in such full and clear terms as will enable those skilled in the art to construct and use the same.

This invention relates to a machine for creasing folding boxes after they leave the machine to which they are formed so as to enable them to be readily packed for shipment.

This machine is intended to be used as an attachment to other machines for forming boxes, or may be used simply as a folding machine, the boxes being placed therein manually after they have been made.

Other objects of the invention will appear as the description proceeds.

An embodiment of the invention is shown in the drawing in which the same reference numeral is applied to the same portion throughout, but I am aware that there may be many modifications thereof.

Fig. 2 is a plan view of the complete folding mechanism,

Fig. 3 is a vertical sectional view on the line 3—3, Fig. 2, certain parts of the machine being omitted, Fig. 4 is a perspective view of a box showing the folded lines produced, and Fig. 5 is a back view of the plate supporting the folders.

Figure 1:
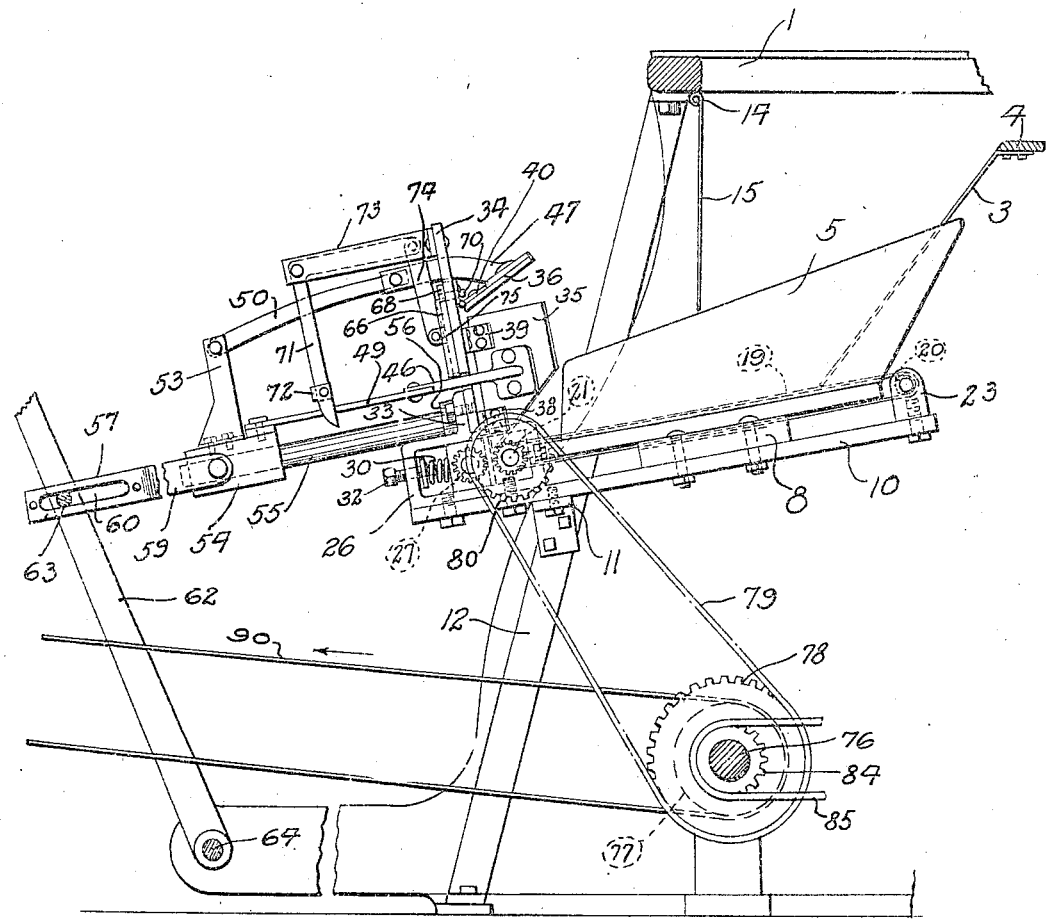
Figure 1 is a side elevation of the complete folding mechanism.

The numerals 1 and 2 indicate the side frames of a machine for forming the boxes, from which the boxes to be folded are delivered into the hopper formed by the plate 3 supported on a cross bar 4 and the sides 5 and 6 adjacent the chute bottom 7. The chute bottom 7 is supported on a cross bar 8, which cross bar is bolted to two longitudinally extending bars 9 and 10, which latter bars are in turn supported on a cross bar 11 bolted to two upwardly extending posts 12 and 13. Extending across the top of the frames 1 and 2 is a cross bar 14 which has a swinging gate 15 depending therefrom, which gate serves to tip the box down on to the cover to the position illustrated in Fig. 4 from the position illustrated in Fig. 3 when dropped into the hopper. As soon as the boxes drop into the hopper they fall on a series of narrow belts 16, 17, 18 and 19 which pass around small rollers 20 and 21. The roller 20 is supported in journal boxes 22, 23 at the upper end of the bars 9 and 10, while the roller 21 is supported on journal boxes 24 in the slots of the adjusting brackets 25, 26. Immediately adjacent the roller 21 is a roller 27 which is supported in movable journal boxes 28 in the two brackets 25, 26. The journal boxes 28 are resiliently held in position by means of springs 30 in the brackets 25, 26, which springs are adjusted by means of the set screws 31, 32. The roller 27 is corrugated and the roller 21 has several corrugated portions whereby the boxes are more readily drawn therebetween when the folding has taken place.

The brackets 25, 26 each have an upwardly projecting lug 33, which lug forms the support for a plate 34 which is bolted thereto, said plate standing in a position at right angles to the plane of the chute 7 over which the boxes pass. The plate 34 has three folding plates 35, 36 and 37 connected thereto by means of the hinges 38, 39, 40, 41, 42 and 43. The plate 35 is provided with a curved arm 46, the plate 36 has a curved arm 47 and the plate 37 has a curved arm 48 rigidly connected thereto. The arms 46, 47 and 48 are connected respectively to three links 49, 50 and 51, two of said links 49 and 51 being connected to a cross bar 52, while the link 50 is connected to an upwardly projecting arm 53. The cross bar 52 and arm 53 are connected to a slidable block 54, which block is slidable on a rod 55, one end of which is rigidly connected with a boss 56 on the plate 34.

The slide 54 has a pitman 57 connected thereto by means of the two arms 58, 59 and the pitman is provided with a slide 60 which enables the reciprocating levers 61, 62 and rod 63 to close and open the folding plates in the proper times. The levers 61, 62 are connected with and are operated by some other suitable part of the box making mechanism, not illustrated herein and which forms no part of the present invention, but are pivotally supported on the cross rod 64.

On the back of the plate 34 there are two guides 66, 67 which form the track for a slidable plate 68. The plate 68 has two pins 69, 70 which project through the slots 68', 60 in the plate 34 for the purpose of pushing the box down out of the folding mechanism as soon as the folding operation has taken place. This movement is effected by means of the bell crank 71 with the loose pawl 72 at its lower end, a fixed arm 73 connected with the top of the plate 34, link 74 and lug 75 on the back of the plate 68.

On the lower part of the frames 1 and 2 there is a shaft 76 which shaft carries a pulley 77 and sprocket gear 78, a sprocket chain 79 extending from the sprocket wheel 78 to a sprocket wheel 80 on the shaft carrying the roller 21. The shaft 76 carrying the roller 81 is provided on the end opposite the sprocket wheel 80 with a gear 82 in mesh with a gear 83 of the same size on the shaft of the roller 27, the object being to drive said rollers at the same speed. The shaft 76 is driven from any other suitable part of the apparatus by means of the sprocket wheel 84 and chain 85.

In operation the boxes are dropped into the chute over the endless belts 16 to 19 inclusive and if they tend to fall into the position illustrated in Fig. 3 the swinging gate 15 will detain the upper end of the box sufficiently to cause them to lie down in the position illustrated in Fig. 4 and the belts will deliver them against the plate 34. The timing of the apparatus is such that as soon as the boxes strike against the plate 34 the folding plates 35, 36 and 37 will close in and form creases in the box as illustrated in Fig. 4, and the length of the slot 60 is so arranged that the folding plates will not be removed from contact with the box until the block 54 has moved back and caught the loose pawl 72, whereupon the slidable plate 68 will be pushed down and the pins 69, 70 carried thereby will push the crushed box into the rollers 21 and 27, thereby causing it to be tightly rolled down into the form given to it by the folding plates. As soon as the box passes through the rollers it falls upon the conveyer belt 90 which passes around the pulley 78 and is delivered to a suitable packing table not illustrated herein and forming no part of this invention.

Having thus described my invention what I claim as new and desire to secure by Letters Patent of the United States, is as follows, express reservation being made of permissible modifications:

1. A box folding machine comprising a stop plate, three pivoted plates carried thereby and adapted to collapse the sides of a box against its bottom, means to push the box out of contact with the several plates before they have been completely released therefrom, and a pair of rollers adjacent the stop plate through which the box passes to completely flatten it.

2. In a box folding machine, the combination with a chute of a stop plate, pivoted folding plates secured to said stop plate to collapse the sides of a box, and a pair of rollers to flatten the collapsed box after leaving the folding plates.

3. In a box folding machine, a stop plate against which the boxes strike, pivoted folding plates adapted to collapse three sides of the box, a pair of rollers below the stop plate, and means to push the box down into the rollers to flatten the same before the folding plates are completely released therefrom.

4. A box folding machine comprising a chute, a stop plate, pivoted folding plates carried by the stop plate and adapted to collapse three sides of the box, a pair of rolls below the stop plate, and reciprocating prongs adapted to push the box down into the rolls before the folding plates are completely released therefrom.

5. A box folding machine comprising a chute, a stop plate adjacent said chute and against which the boxes strike, pivoted folding plates carried by said stop plate and adapted to collapse three sides of the box, a pair of rollers below the stop plate, means to push the collapsed box down between said rollers before the folding plates have been completely released therefrom, and means to open the folding plates after the rollers have caught the box.

6. A box folding machine comprising a chute, means over the chute to turn the box so that it will occupy a given position, a stop plate adjacent the end of the chute against which the box strikes, three folding plates carried by the chute, a reciprocating slide having links connecting it with said folding plates, means to reciprocate said slide to collapse three sides of the box, a pair of rolls below the stop plate, and means operated by the slide to push the box down into said rolls before the folding plates are completely released therefrom.

7. A box folding machine comprising a chute having endless conveyers therein and upon which the box to be folded is placed, a stop plate against which said endless conveyers carry the box, and a plurality of hinged folding plates secured to said stop plate and adapted to collapse three sides of the box.

8. In a box folding machine, a chute, a plurality of endless conveyers in said chute adapted to convey a box, a stop plate adjacent the end of said chute against which the box strikes, three folding plates pivoted to said stop plate, means whereby said plates are moved to collapse three sides of the box, and a pair of rollers below the stop plate between which the box is adapted to be passed to be completely flattened.

9. A box folding machine comprising a chute, endless conveyers therein, a stop plate adjacent the bottom of the chute and against which the conveyers carry the box to be folded, three pivoted folding plates secured to said stop plate and adapted to be moved to collapse three sides of the box, a pair of rollers below the stop plate, and means to push the box into engagement with said rollers before the folding plates have been completely released therefrom.

10. A box folding machine comprising a chute, a plurality of endless carriers in said chute, a stop plate adjacent the end of said chute and against which the carriers are adapted to carry a box, a pivoted gate to cause said box to lie in a given position when passing through the chute, three pivoted folding plates carried by the stop plate, means to move them to collapse three sides of the box against its bottom, means to push the box down before the folding plates are completely released therefrom, and a pair of rolls below the stop plate through which the box passes to completely flatten it.

11. A box folding machine comprising a chute, a plurality of endless carriers in the bottom of said chute, a stop plate against which the carriers carry the box, a pivoted gate to cause the box to assume a given position when traveling through the chute, three pivoted plates carried by the stop plate and adapted to be moved to collapse three sides of the box against its bottom when it touches the stop plate, a slide having links connected therewith and operating said folding plates, a second slide having prongs adapted to push the box downwardly before the folding plates have been completely released therefrom, a bell crank lever for operating said slide in conjunction with the slide for operating the folding plates, and a pair of rollers below the stop plate between which the box is adapted to pass to be completely flattened.

12. A box folding machine comprising a stop plate, three pivoted plates adapted to collapse the sides of a box against its bottom, means to push the box out of contact with the several plates before they have been completely released therefrom, and rollers adjacent the stop plate through which the box passes to completely flatten it.

13. A box folding machine comprising a stop plate, pivoted plates carried thereby and adapted to collapse the sides of a box means to push the box out of contact with the several plates before they have been completely released therefrom, and a pair of rollers adjacent the stop plate through which the box passes to completely flatten it.

14. A box folding machine comprising a stop plate pivoted plates adapted to collapse the sides of a box against its bottom, means to push the box out of contact with the several plates before they have been completely released therefrom, and means adjacent the stop plate through which the box passes to completely flatten it.

15. A box folding machine, a stop plate against which the box is carried, plates to collapse the sides of the box, means to further flatten the box and a pusher to carry the box into the flattening mechanism.

16. A box folding machine, a stop plate against which the box is carried, a plurality of pivoted plates for collapsing the box sides, means to further flatten the box, and a pusher adapted to push the box into the flattening mechanism before the side collapsing mechanism has fully released.

17. A machine for folding boxes comprising a carrier, a stop plate against which the carrier brings the boxes, a plurality of pivoted plates adapted to collapse the box sides, rollers below said pivoted plates and a pusher to force the partially flattened box down into the rollers.

18. A machine for folding boxes comprising a series of endless belts, a stop plate against which the belts carry a box, a series of plates adapted to collapse the box sides, rollers below the stop plates, and a pusher movable in the plane of the stop plate to force the box down into the rollers to completely flatten it.

In testimony whereof I have hereunto set my hand this 16th day of June, A. D. 1916.

CHAS. F. RAYNAUD.